United States Patent
Kumpf et al.

(10) Patent No.: US 6,839,755 B1
(45) Date of Patent: Jan. 4, 2005

(54) NETWORK PERIPHERAL SERVER DISCOVERY METHOD

(75) Inventors: David A. Kumpf, Rocklin, CA (US); Glenn R. Garcia, Grass Valley, CA (US); David L. Smith, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 09/163,787

(22) Filed: Sep. 30, 1998

(51) Int. Cl.[7] .................. G06F 15/173; G06F 15/16
(52) U.S. Cl. ........................ 709/225; 709/228
(58) Field of Search ................. 709/203, 219, 709/225, 217, 228, 226, 229; 358/1.15, 1.13; 710/3, 4, 15, 36, 42

(56) References Cited

U.S. PATENT DOCUMENTS

| | | | | |
|---|---|---|---|---|
| 5,548,722 A | * | 8/1996 | Jalalian et al. ............ 709/220 |
| 5,590,288 A | * | 12/1996 | Castor et al. ............. 709/201 |
| 5,687,320 A | * | 11/1997 | Wiley et al. .............. 709/245 |
| 5,774,662 A | * | 6/1998 | Sakagawa ................. 709/203 |
| 5,784,560 A | * | 7/1998 | Kingdon et al. ........... 709/201 |
| 5,928,335 A | * | 7/1999 | Morita .................... 709/203 |
| 5,933,580 A | * | 8/1999 | Uda et al. ................ 358/1.13 |
| 6,101,528 A | * | 8/2000 | Butt ...................... 709/203 |
| 6,101,555 A | * | 8/2000 | Goshey et al. ............ 709/321 |
| 6,131,120 A | * | 10/2000 | Reid ...................... 709/225 |
| 6,177,934 B1 | * | 1/2001 | Sugiura et al. ........... 345/335 |
| 6,195,694 B1 | * | 2/2001 | Chen et al. .............. 709/220 |
| 6,195,712 B1 | * | 2/2001 | Pawlowski et al. ......... 710/19 |
| 6,223,223 B1 | * | 4/2001 | Kumpf et al. ............. 709/227 |
| 6,237,032 B1 | * | 5/2001 | Scoville et al. .......... 709/221 |
| 6,289,371 B1 | * | 9/2001 | Kumpf et al. ............. 709/203 |

FOREIGN PATENT DOCUMENTS

| | | |
|---|---|---|
| EP | 0756400 | 1/1997 |
| EP | 0859309 | 8/1998 |

* cited by examiner

*Primary Examiner*—Jason D. Cardone

(57) ABSTRACT

A multifunction peripheral server discovery method with reduced network traffic is disclosed. Peripheral servers on a network advertise their basic function, such as print, and clients seeking peripherals with an additional function, such as scan, retrieve ID strings of peripherals having the basic function to determine if the additional function is available. The method also permits a user of a client on the network to enter addresses of peripherals not discovered when the client searches for peripherals having the additional function. The method also permits selection of a network protocol to be used by the client. An additional preferred step in the method is a determination of whether discovered peripherals having the additional function are compatible with a software application run by the client.

12 Claims, 10 Drawing Sheets

NETWORK PERIPHERAL SERVER DISCOVERY METHOD

BACKGROUND OF THE INVENTION

The present invention generally relates to software, and more particularly to software for discovering peripheral server devices on a network.

Computer network servers are an integral segment of the computer industry. Networks establish connections with at least one server which in turn initiate connections with one or more peripherals. Such peripherals perform many functions, including scanning. Some peripherals, namely multifunction peripherals, combine scanning with various other functions such as printing, sending and receiving facsimiles and copying. When a user wishes to perform a function, for example, a scan, it is important to determine which servers, if any, can establish a connection with a peripheral containing the required scan capabilities.

Known methods to determine available network servers include the user physically locating the server, using a name lookup service to ascertain the server's name, or using discovery software to find all available servers which meet certain criteria. However, as will be discussed below, each of several known methods has its own benefits and attendant problems.

A problem exists when the user attempts to physically locate servers on the network since this action can be time consuming, and prone to user error. Servers are usually remotely located, requiring the user to leave the workstation in search for one or more servers that can establish a connection to the peripheral that the user wants to use. The user is often not aware of some or all of the locations of the servers on the network. If the user does physically locate the server, it is sometimes possible to ascertain the address of the server by viewing a sticker placed on the server by a network administrator or some other person. Likewise, if the address is not written on the server, some servers contain a button that the user can press to send the server's address to an attached printer. Additionally, even after the user determines the address of the server that he desires, the user must manually enter the server's address, and such manual entry is prone to errors by the user.

Additional problems exist when using a name lookup service, such as a domain name service (DNS) protocol or service advertising protocol (SAP), to find the server. DNS is used for transmission control protocol/internet protocol (TCP/IP) protocol networks and SAP is used for sequenced packet exchange/internetwork protocol exchange (SPX/IPX) protocol networks. A problem with using the name lookup operation is that the user must know the name of the server the user is looking for. Sometimes the network administrator writes the name on the server, but often the server is remotely located. Another problem with using the name lookup is that the name lookup operation will only find servers for the name that the user entered. Thus, the name lookup will not find servers of a different name that the user may wish to employ.

Further problems exist with known discovery software due to SAP packet traffic on the network. Among other things, SAP packets indicated the type of service being offered, as well as a network access point, i.e., network and socket address, which clients can use when accessing the server. While SAP gives scan servers and other service providers the ability to periodically advertise their services on the network, the SAP packet traffic causes congestion on the network. For example, traditional servers send a separate SAP for each socket being advertised, i.e., for each print socket and each scan socket. Thus, under the traditional scheme, a three port server would generate six SAPs since the server would send a separate SAP advertisement for each print and scan socket. Likewise, a one port server would generate two SAPs on a regular basis.

Another problem with known discovery software is its inflexibility. Typically, discovery software only allows the user to select from a group of discovered servers. There are times, however, that the user may wish to enter a known server address. Additionally, there are times that a user must enter a server address because the discovery software failed to find any servers.

Accordingly, it is a primary object of the present invention to provide an improved method for discovering network peripheral servers.

Another object of the present invention is to provide an improved method for reducing SAP traffic.

Yet another object of the present invention is to provide an improved method for allowing the user to manually enter a server address.

Other objects and advantages will become apparent upon reading the following detailed description, in conjunction with the attached drawings.

SUMMARY OF THE INVENTION

The present invention is directed to a method that is implemented by software and is adapted to discover peripheral servers that a peripheral specific software can utilize. The method reduces service advertising protocol (SAP) traffic and supports multiple network protocols. The method also permits the user of a client on a network to enter addresses of peripherals that have not been discovered when the client searches for peripherals having an additional function such as the scan function, for example. The method also permits selection of a network protocol to be used by the client computer.

---

TABLE OF ACRONYMS
This patent utilizes several acronyms.
The following table is provided to aid the reader
in determining the meaning of the several acronyms:

CPU = central processing unit.
DNS = domain name service.
ID = identification.
IP = internet protocol.

-continued

TABLE OF ACRONYMS
This patent utilizes several acronyms.
The following table is provided to aid the reader
in determining the meaning of the several acronyms:

IPX = internetwork protocol exchange.
MIB = management information base.
PC = personal computer.
SAP = service advertising protocol.
SLP = service location protocol.
SNMP = simple network management protocol.
SPX = sequenced packet exchange.
TCP = transmission control protocol.

DETAILED DESCRIPTION

Broadly stated, the present invention is directed to a method, implemented principally by software, that is adapted to discover peripheral servers that a peripheral specific software can utilize, which reduces SAP traffic and supports multiple network protocols.

Figure 1:
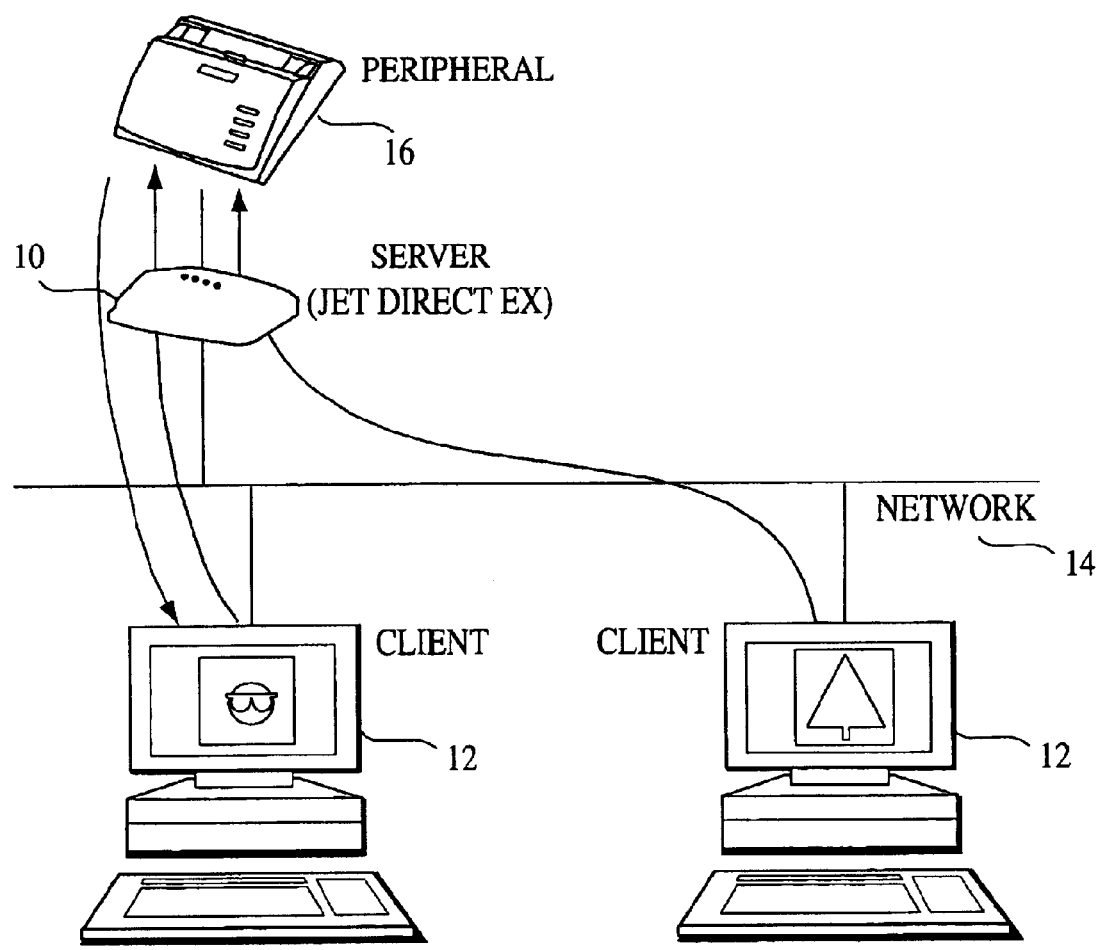
FIG. 1 is an overview of the network system.

Turning now to the drawings, and particularly FIG. 1, a server 10 of the present invention establishes a connection between a client 12 on a network 14 and a peripheral 16, such as a scanner. While the server 10 referred to is used as part of a Hewlett-Packard JETDIRECT EX box package, it is contemplated that the server 10 can be part of a card that connects via a bus interface to the peripheral 16, or as part of an internal central processing unit (CPU) of the peripheral 16. The JETDIRECT EX box is shown and described in a Hewlett-Packard user manual, part no. 5967-2290, and is incorporated by reference herein.

Figure 2:
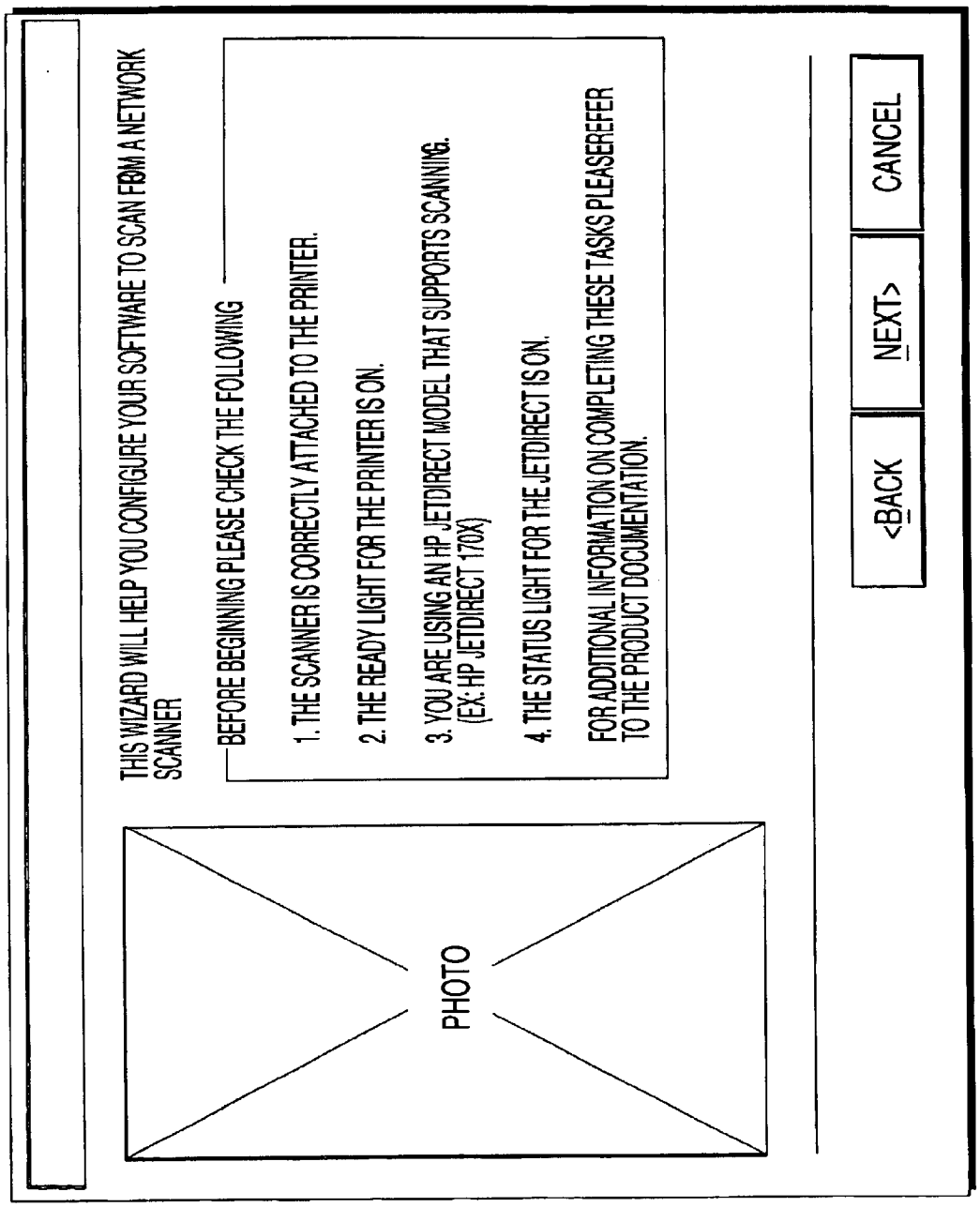
FIG. 2 is a preferred discovery welcome page.
Figure 3:
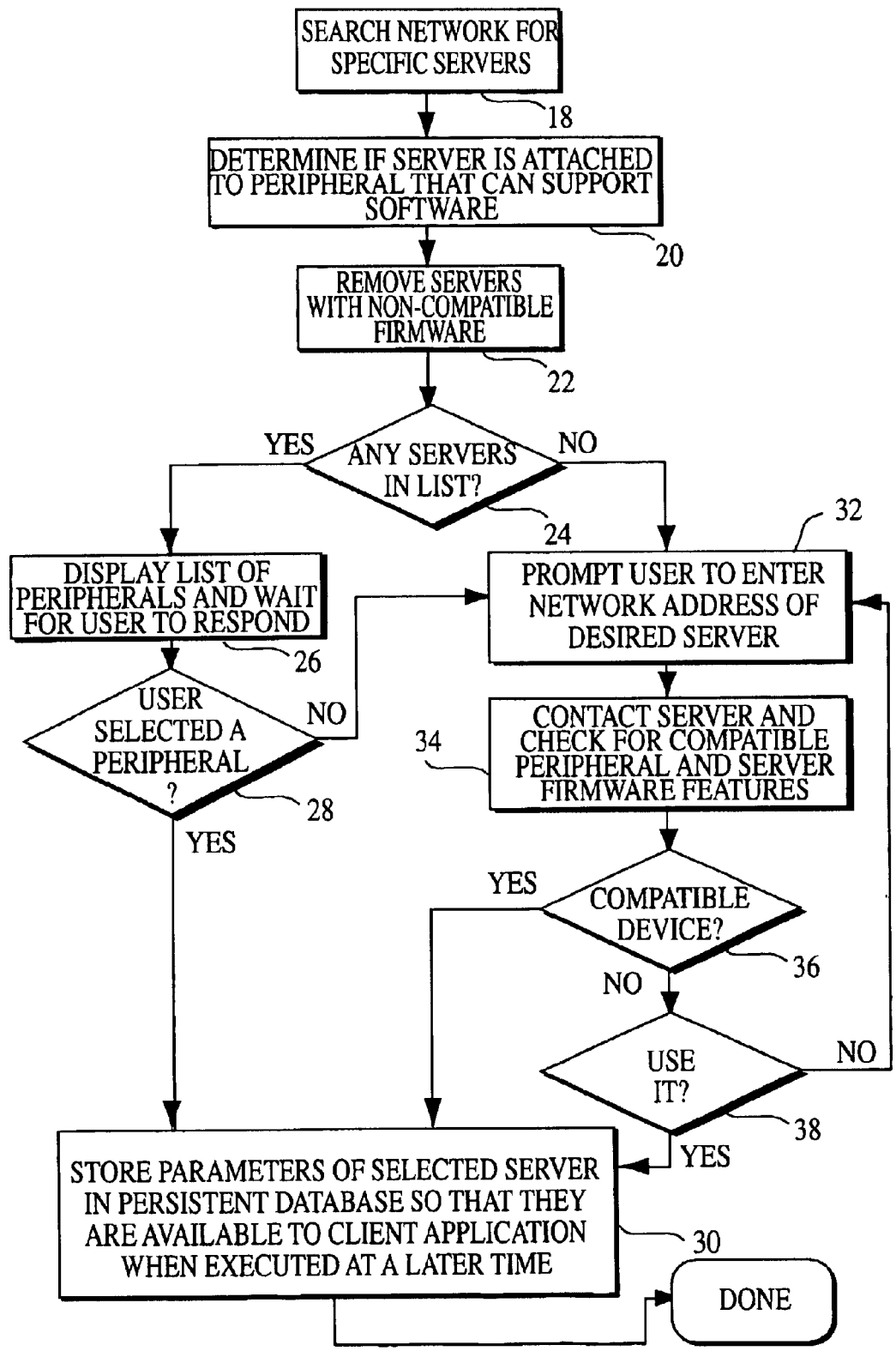
FIG. 3 is a flow chart illustrating functions of the networked scan server discovery method of the present invention.

For purposes of illustrating the present invention, it is assumed that the user is searching for a peripheral 16 that can support scan functions, but artisans will appreciate its applicability to searching for peripherals performing other functions. Referring to FIG. 2, a welcome screen is displayed on a client display, which may be a personal computer (PC), for example. The screen prompts a user through various steps to insure that the peripheral 16 is properly set up and attached to a server 10 that supports scanning, and that both the peripheral 16 and the server 10 are powered on. Referring to FIGS. 2 and 3, after the user clicks a "next" button on the discovery welcome screen, the client 12 software of the present invention, hereinafter referred to as the client 12, searches the network 14 for specific servers 10, e.g., JETDIRECT EX boxes (block 18). The client 12 uses a service location protocol (SLP), for a TCP/IP network 14, or a SAP for a SPX/IPX network 14, to elicit responses for all servers 10 of the specified type. The servers 10 will use SAP to announce a print function for each attached peripheral 16. This is true even if an attached peripheral only performs a function other than print. The client determines that the specific servers 10 has been found by matching a name of the server 10 that was found to a list of names that the client 12 is searching, e.g., JETDIRECT EX boxes. Based on the matches, the client 12 produces a data list of potential servers 10.

Importantly, and referring to FIG. 3, for each server 10 on the data list, the client 12 next determines if a peripheral 16 attached to the server 10 is compatible with a software application for which the discovery operation is being performed, e.g., a scan software application (block 20). To determine if the peripheral 16 can scan, the client 12 retrieves a peripheral ID string from the server 10 using a simple network management protocol (SNMP), and parses the ID string to determine if the peripheral 16 supports scanning. The SNMP is a standard network protocol that is generally used for configuring and monitoring network devices. It is contemplated that similar protocols can be used by the present invention. After determining which servers 10 possess peripherals 16 that support scanning, the client 12 removes servers 10 from the data list that do not support scanning. By engaging in the above two step process, i.e., searching for JETDIRECT EX servers and then using SNMP to determine if the server 10 supports scanning, the present invention reduces SAP traffic. For example, typical clients 12 use SAP to discover print servers 10 and also use SAP to discover scan servers 10 on the SPX/IPX network. This requires the server 10 to send SAP requests for both print and scan services. Importantly, the present invention reduces network traffic caused by SAPs since the client 12 only requires the server 10 to advertise its print services, and not scan services. By requiring the server 10 to advertise only its print services, the client 12 effectively cuts in half the number of SAPs arriving from the server 10.

After it is determined that the server 10 supports scan functions, the scan socket number on the server 10 is established, and the client 12 takes advantage of the fact that the server's 10 scan socket number is always equal to the advertised print socket number plus one. For a multifunction peripheral attached to a physical server port, a separate socket is maintained for its separate functions, e.g., print and scan. Therefore, the client 12 adds one to the advertised print server socket number when accessing the scan server socket. As discussed above, this method conserves network bandwidth because the present invention will only issue SNMP queries when attempting to discover scan devices, whereas the periodic SAP advertisements are sent on a continual basis, typically every two seconds.

After the client 12 removes servers 10 that do not support scanning from the data list, for each server 10 remaining in the list, the client 12 checks to determine that the server 10 contains the required firmware for the specific software application (block 22). To determine that the server 10 contains the required firmware, the client 12 sends a SNMP query to determine if a certain scan management information base (MIB) object exists on the server 10. For example, the MIB object could be a time out variable used by the software application. If the object does not exist, the server 10 returns an error in response to the client's 12 request and the server 10 is removed from the data list of servers 10.

Figure 4:
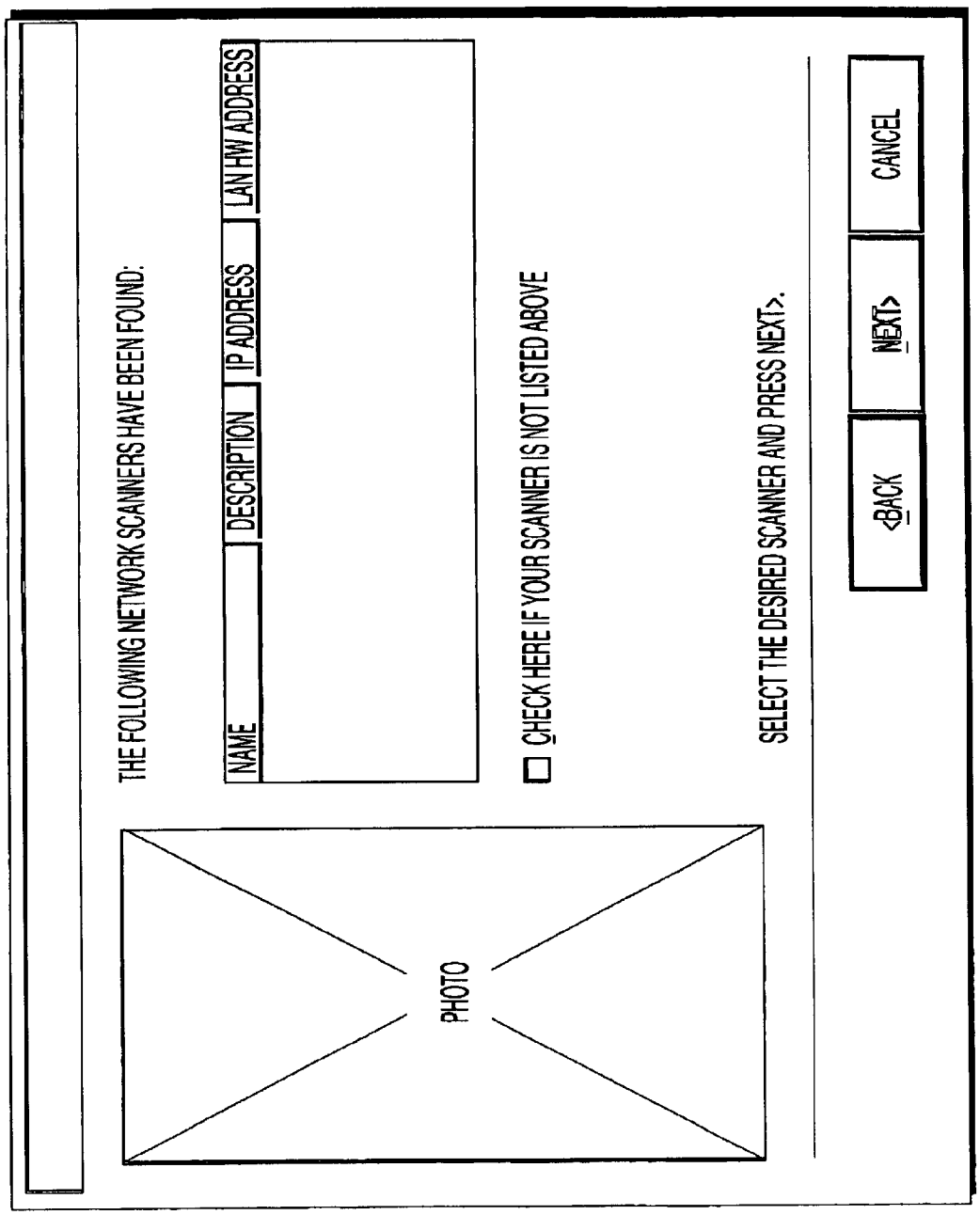
FIG. 4 is a preferred discovery server list page.

Subsequently, the client 12 determines if any servers 10 remain on the data list (block 24). If servers 10 remain on the list, the client 12 displays a list of peripherals 16 attached to the servers 10 on a page shown in FIG. 4, and waits for the user to either select one of the servers 10 or indicate that the desired server is not in the list (block 26). Referring to FIG. 4, the user responds by mouse clicking on the name of the desired peripheral 16, or by clicking on a check box if the desired peripheral 16 is not listed. Returning to FIG. 3, if the user selects a scanner (block 28), the client 12 stores parameters of the accompanying server 10 in persistent memory, e.g., WINDOWS 95 and NT registry, so that the parameters are available to the client 12 when the software application is executed at a later time (block 30). While a client 12 could perform a discovery operation every time the user wishes to scan, this is not the preferred embodiment since the discovery operation takes time to perform.

Figure 5:
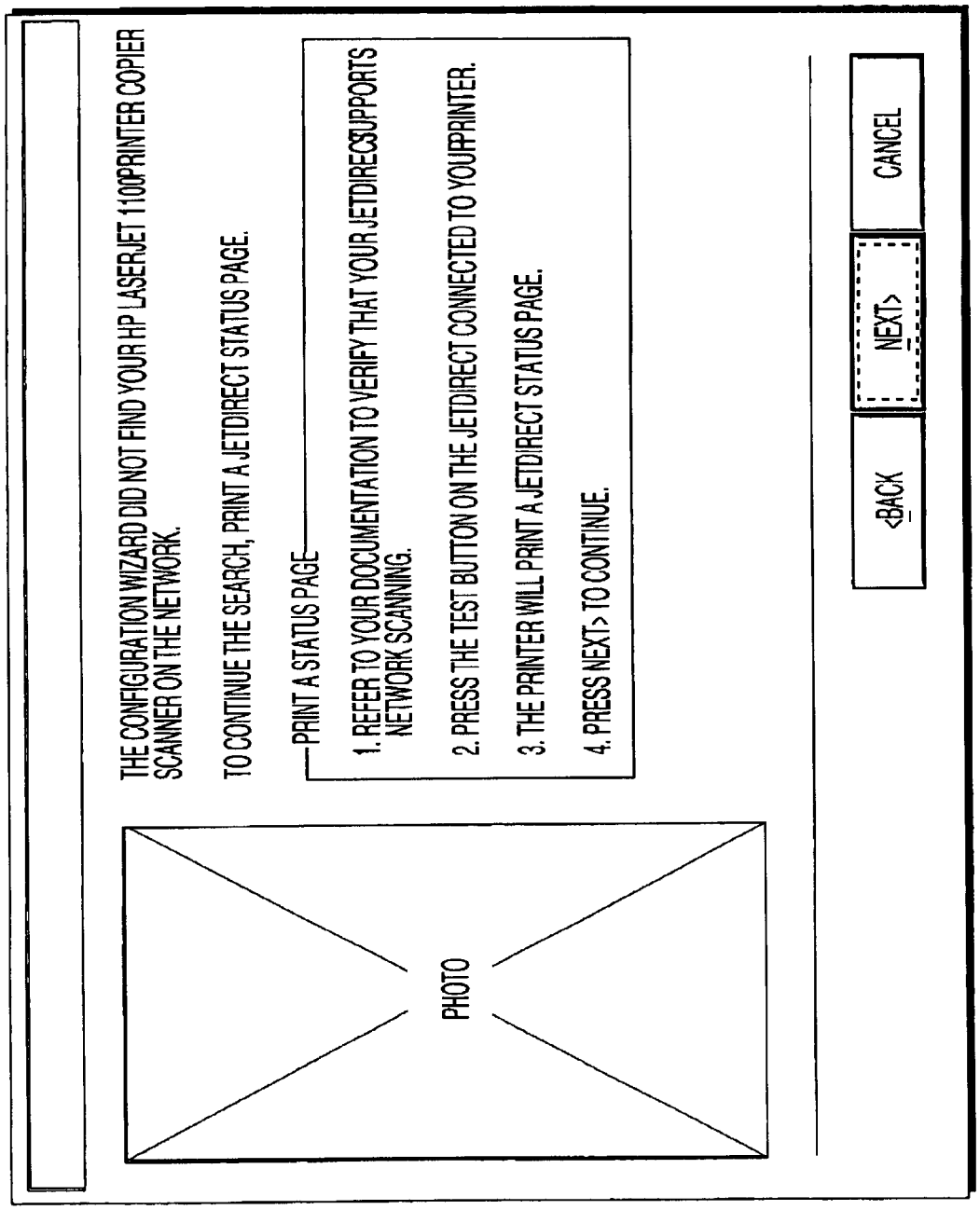
FIG. 5 is a preferred page containing instructions to locate a server address.

Alternatively, if no servers 10 exist in the data list (block 24) or the user decides not to select a peripheral 16 from the list (block 28), the user can mouse click a "next" button shown in FIG. 4 to select a server 10 of the user's choice. For example, the peripheral 16 may have been turned off when the client 12 performed the discovery operation. Referring to FIG. 5, is a page with instructions to locate a server address is shown. The user can mouse click a test button on the JETDIRECT EX server 10 connected to a printer and the printer will print a JETDIRECT EX status page including the JETDIRECT address.

Figure 6:
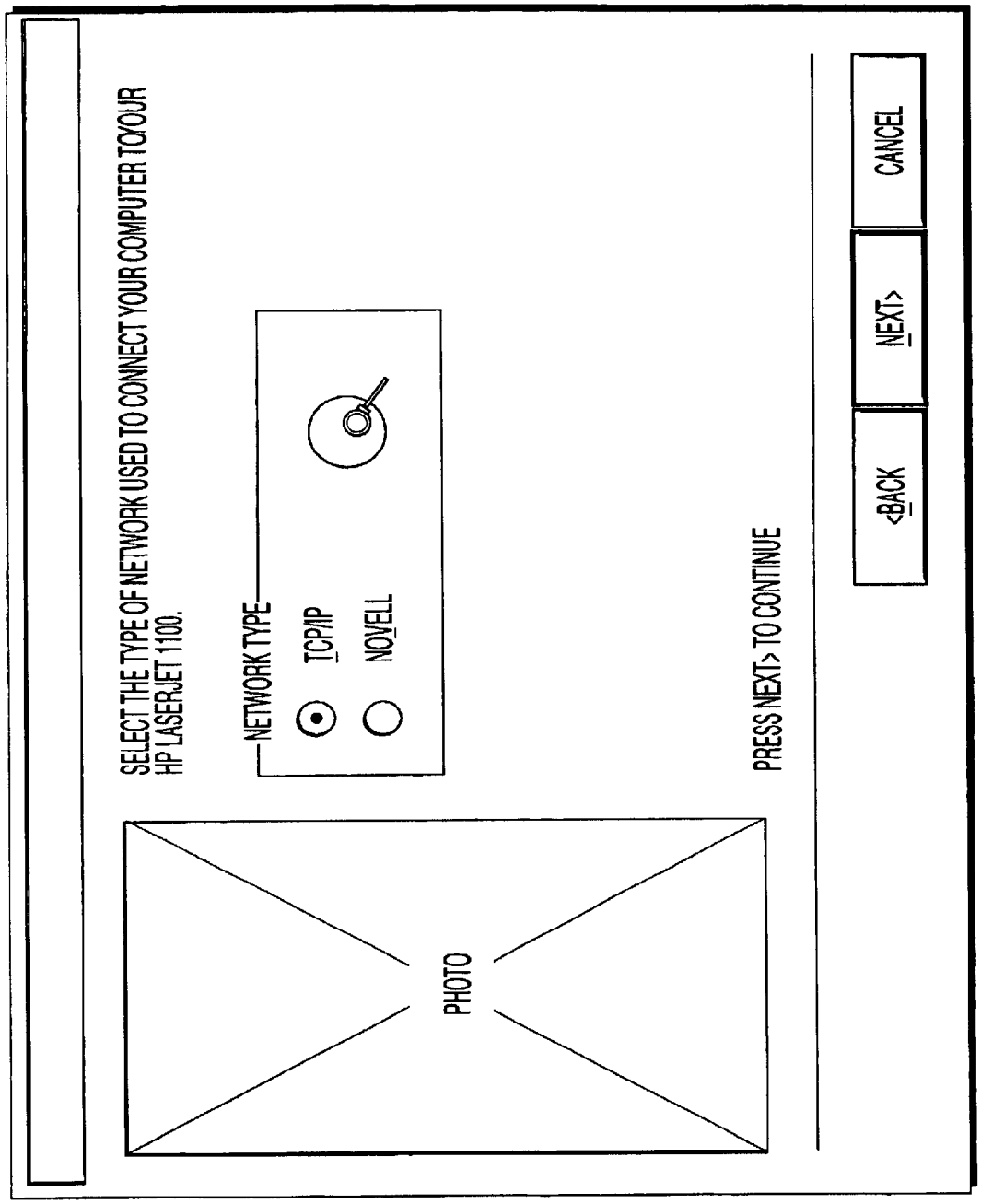
FIG. 6 is a preferred network selection page.
Figure 7A:
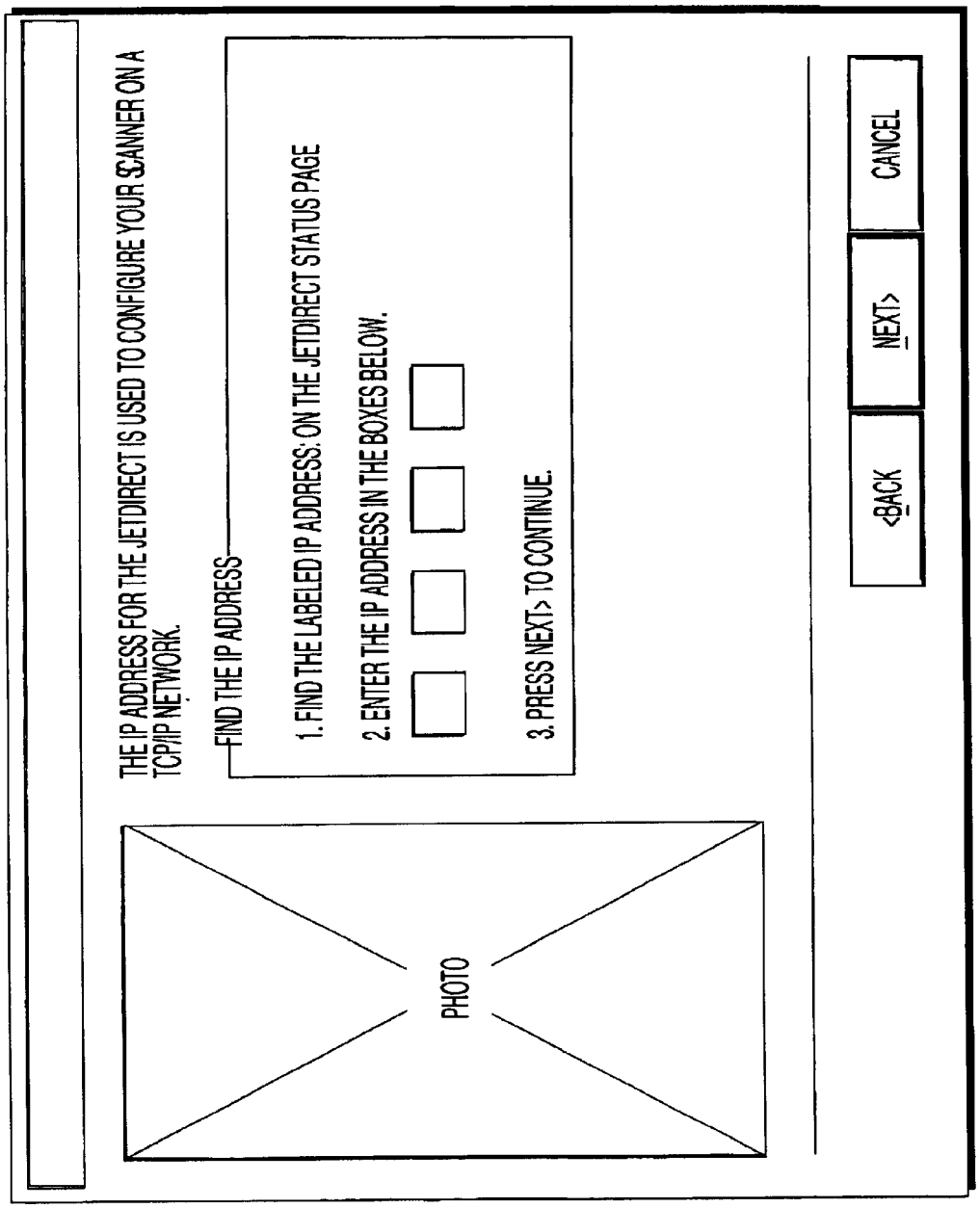
FIGS. 7A–7C are preferred network address entry pages.
Figure 7B:
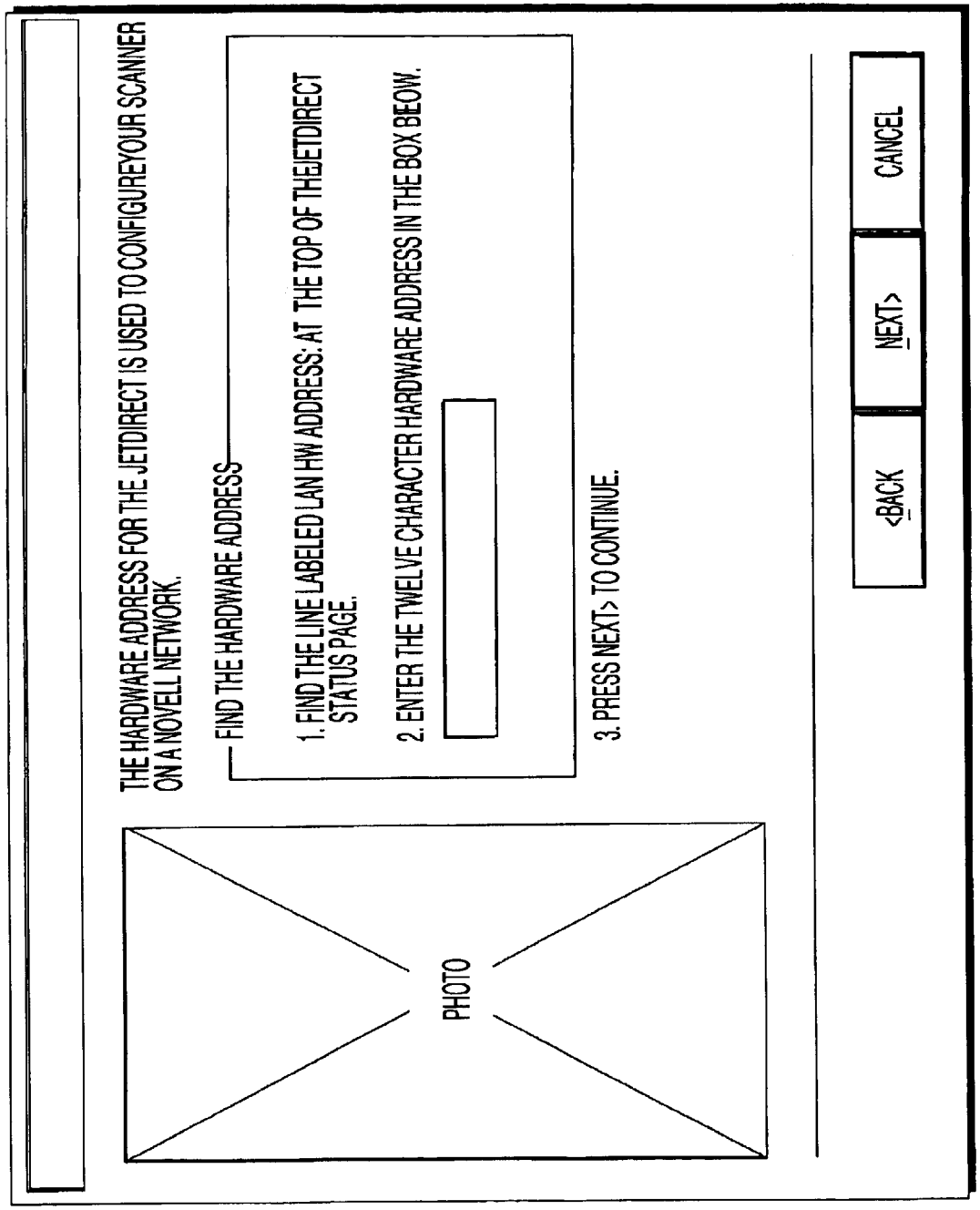
Figure 7C:
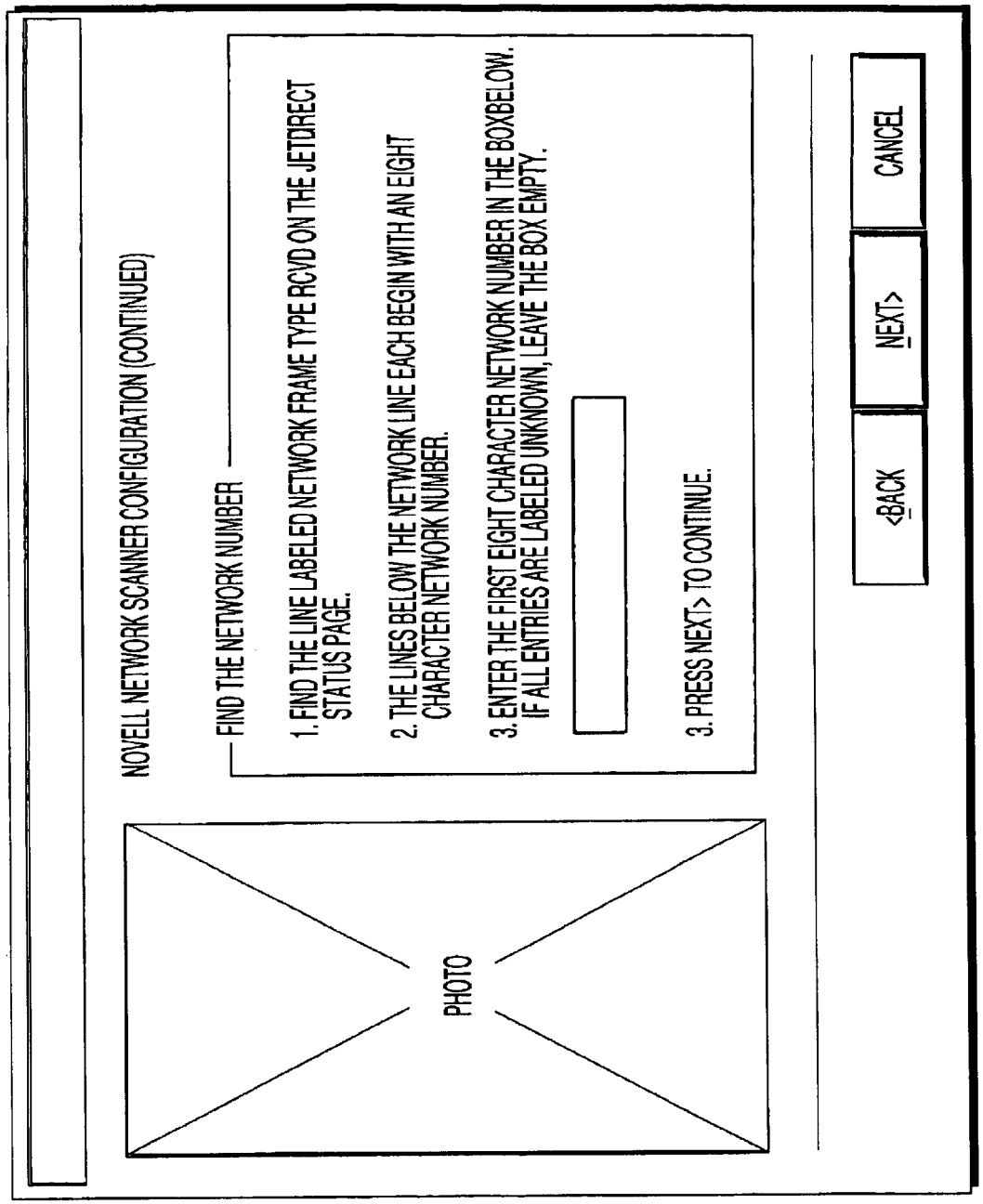

Thereafter, the user clicks a "next" button on the instruction page to display a network selection page as shown in FIG. 6, which prompts the user to select a network used by the client 12, e.g., either TCP/IP or SPX/IPX. After selecting the appropriate network, the user mouse clicks a "next" button on the network selection page. Referring to FIGS. 2, 7A–7C, an appropriate page will appear depending on the network selected by the user, prompting the user to enter the server 10 address (block 32). FIG. 7A is arranged for TCP/IP networks, and FIGS. 7B–7C are arranged for the SPX/IPX networks.

Figure 8:
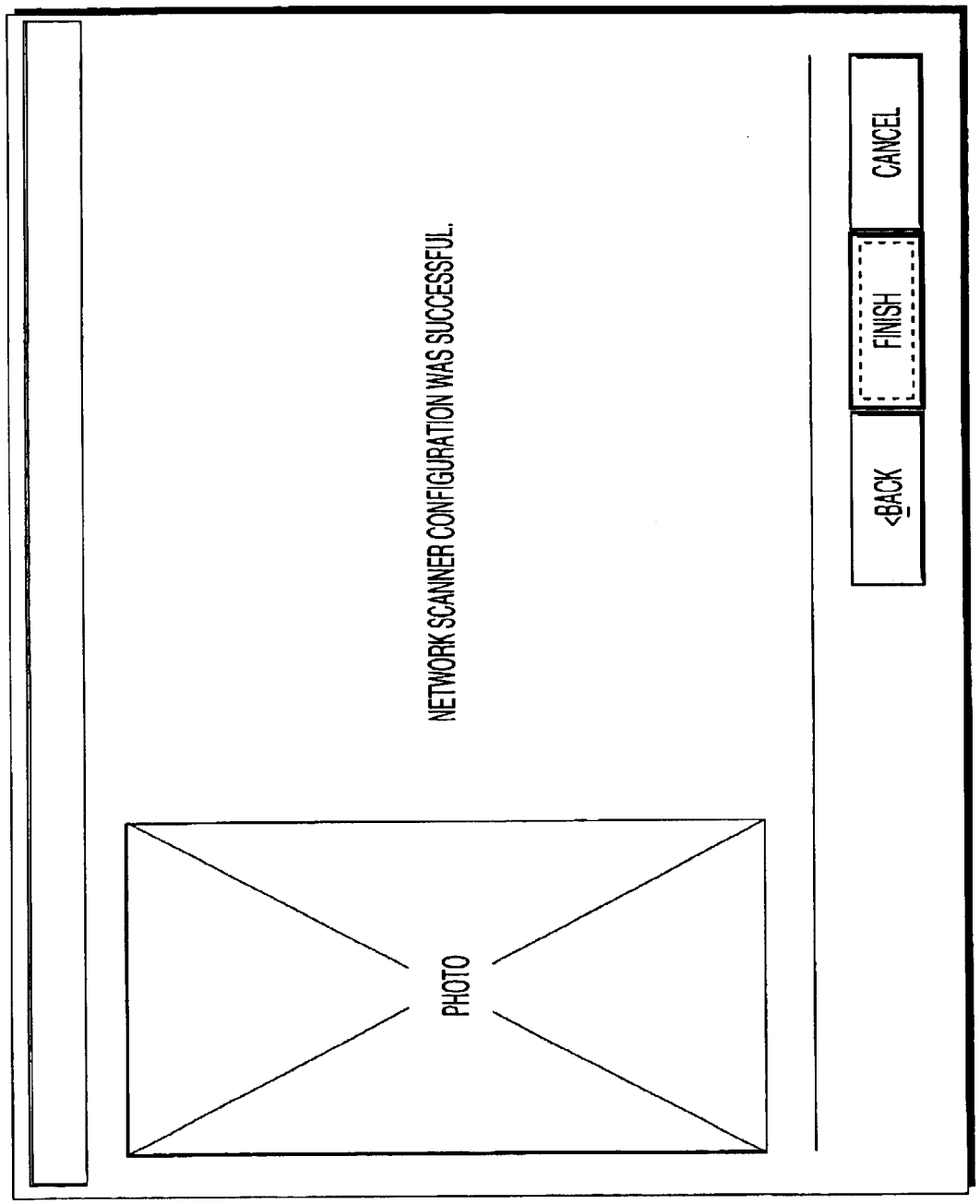
FIG. 8 is a preferred successful configuration page.

After the user enters the server address, the client 12 contacts the server and determines whether compatible peripheral 16 and server firmware features exist, as described above (block 34). If the peripheral 16 and server 10 meet the requirements of the software application (block 36), parameter for the server 10 are stored in persistent memory so that they are available to the client 12 at a later time (block 30). Referring to FIG. 8, the client 12 displays a successful configuration page to end the discovery operation.

Referring again to FIG. 3, if the peripheral 16 and the server 10 do not meet the software application's requirements, the client 12 prompts the user to determine if the server 10 should be used regardless of the fact that the server 10 is not compatible (block 38). If the user still desires to use the incompatible server 10, the client 12 stores the server's parameters in persistent memory (block 30), and displays the successful configuration page, shown in FIG. 8. Otherwise, the user is prompted to enter a new network address of a desired server 10 (block 32).

From the foregoing description, it should be understood that an improved method has been shown and described which has many desirable attributes and advantages. The present invention can discover and allow the user to select specific network peripheral servers. Additionally, the present invention reduces SAP traffic and supports multiple network protocols.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A network client peripheral server discovery method for a client to discover peripheral servers having peripherals with an additional function in addition to peripherals with a basic function, the method comprising steps of:
    announcing, by servers on the network, that they have peripherals having the basic function;
    searching, by a client on the network, for announcements by servers having the basic function;
    forming, by the client, a list of servers having peripherals having the basic function based upon announcements discovered in said step of searching;
    retrieving, by the client, data including that which specifies whether the peripheral has the additional function from servers on the list of servers having peripherals; and
    identifying, by the client, peripherals having the additional function by examining data retrieved in said step of retrieving from the list of servers.

2. The method according to claim 1, further comprising steps of:
    removing servers having peripherals lacking the additional function from the list of servers having peripherals; and
    permitting a user to select from the list of servers having peripherals.

3. The method according to claim 2, further comprising a step of accepting, by the client, a user specified peripheral not on the list of servers having peripherals.

4. The method according to claim 1, wherein said data comprises a peripheral ID string.

5. The method according to claim 1, wherein the basic function is a print function and the additional function is a scan function.

6. The method according to claim 1, further comprising a step of assigning a network address to the peripheral having the additional function.

7. The method according to claim 6, wherein said step of assigning comprises adding a predetermined address increment to a network address for a peripheral having the basic function associated with a same server as the peripheral having the additional function.

8. A network client peripheral server discovery method for a client to discover peripheral servers having peripherals with an additional function in addition to peripherals with a basic function, the method comprising steps of:
    announcing, by servers on the network, that they have peripherals having the basic function
    searching, by a client on the network, for announcements by servers having the basic function;
    forming, by the client, a list of servers having peripherals having the basic function based upon announcements discovered in said step of searching;
    retrieving, by the client, data including that which specifies whether the peripheral has the additional function from servers on the list of servers having peripherals;
    identifying, by the client, peripherals having the additional function by examining data retrieved in said step of retrieving from the list of servers; and,
    determining whether a peripheral having the additional function is compatible with a client software application.

9. The method according to claim 8, wherein said step of determining comprises sending a query to a server that serves the peripheral having the additional function to determine if a predetermined object exists on the server that serves the peripheral having the additional function.

10. The method according to claim 9, wherein the object is a management information database object supporting a specific operation of the additional function.

11. The method according to claim 9, further comprising a step of assigning a network address to the peripheral having the additional function.

12. The method according to claim 11, wherein said step of assigning comprises adding a predetermined address increment to a network address for a peripheral having the basic function associated with the server that serves the peripheral having the additional function.

* * * * *